No. 782,878. PATENTED FEB. 21, 1905.
W. J. RUFF.
PASTEURIZER.
APPLICATION FILED JAN. 11, 1902.
2 SHEETS—SHEET 1.
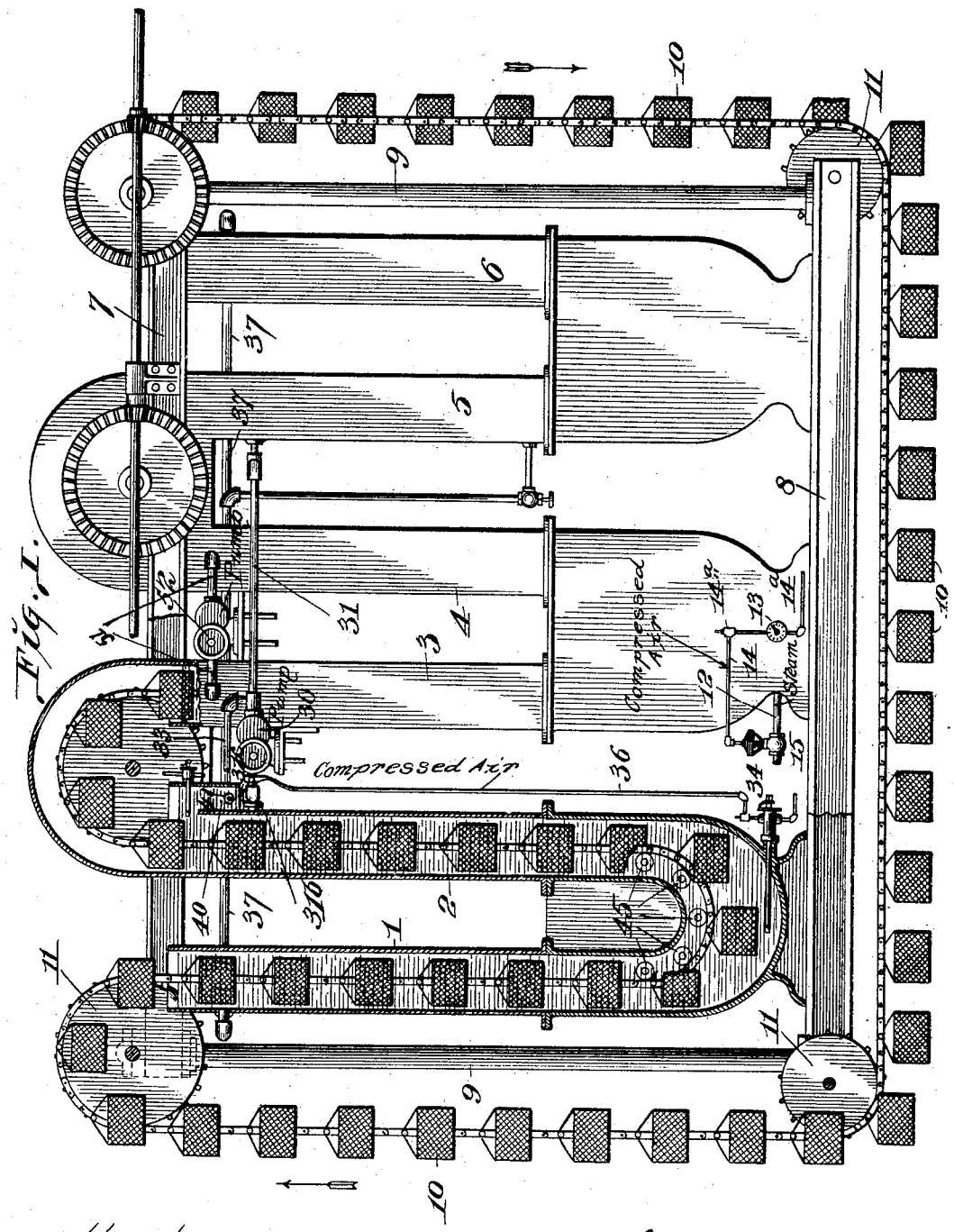

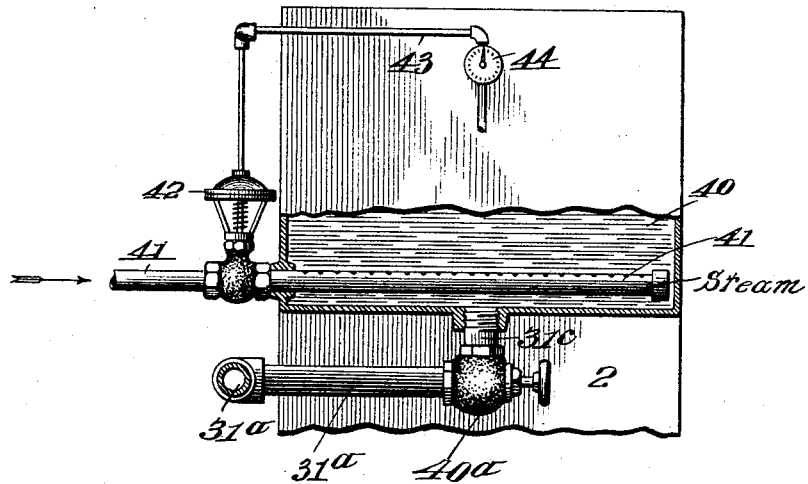
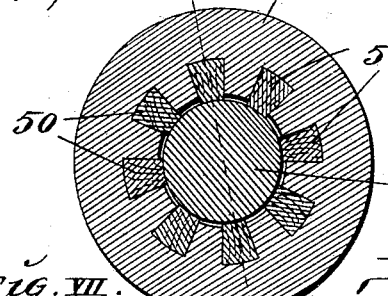
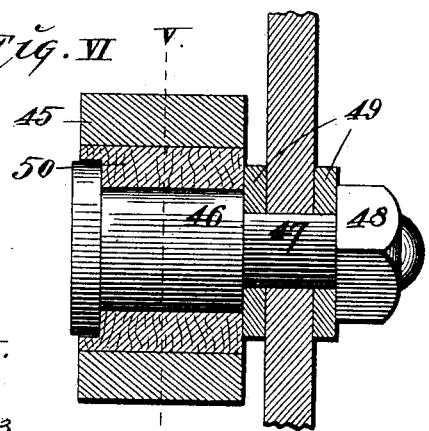
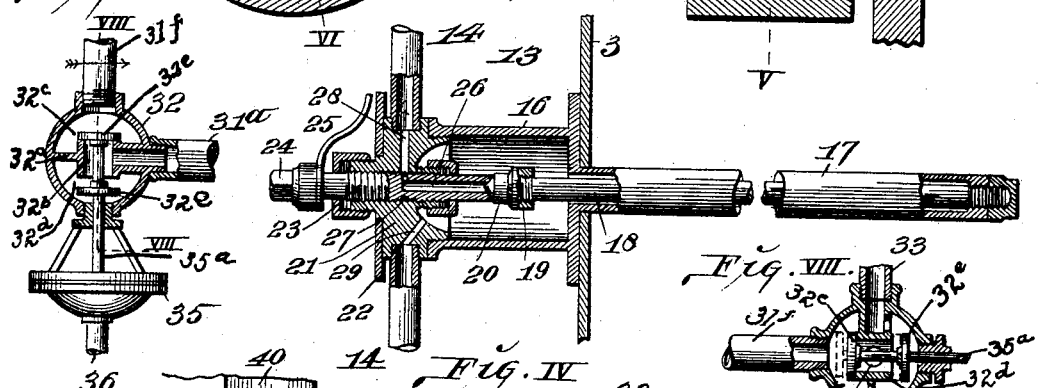
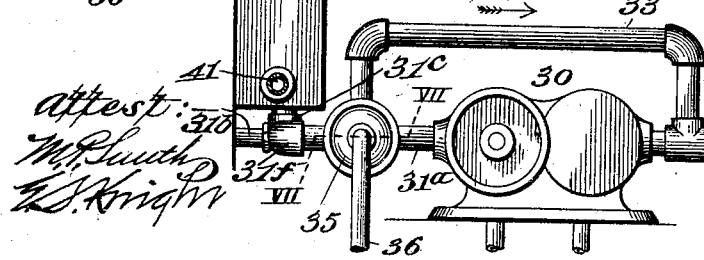

No. 782,878. Patented February 21, 1905.

UNITED STATES PATENT OFFICE.

WILLIAM J. RUFF, OF QUINCY, ILLINOIS.

PASTEURIZER.

SPECIFICATION forming part of Letters Patent No. 782,878, dated February 21, 1905.

Application filed January 11, 1902. Serial No. 89,321.

*To all whom it may concern:*

Be it known that I, WILLIAM J. RUFF, a citizen of the United States, residing at Quincy, in the county of Adams and State of Illinois, have invented certain new and useful Improvements in Pasteurizers, of which the following is a full, clear, and exact description, reference being had to the accompanying drawings, forming part of this specification.

My invention relates to the same class of a pasteurizer as that shown and described in my application for Letters Patent filed September 16, 1901, Serial No. 75,509, wherein there is an attemperating-compartment for gradually heating the beer to something less than the maximum temperature to which the beer is exposed while passing through a sterilizing-compartment, from which the beer passes through a cooling-compartment, by which the temperature is reduced to approximately that of the atmosphere.

The principal object of my present invention is to provide means whereby the beer just before entering the sterilizing-compartment is heated to approximately as high a temperature as the temperature of the sterilizing-compartment, so that as it enters the sterilizing-compartment it will be of a temperature approximately equal to that of the sterilizing-compartment in order that during its entire passage through the compartment it will be subjected to the maximum sterilizing temperature of the machine and does not, as heretofore, travel through a portion of the sterilizing-compartment before reaching the maximum temperature of that chamber, the result being an increase in the capacity of the machine, as the beer can be moved along faster and yet be exposed for a sufficient length of time to the maximum temperature of the sterilizing-compartment to effect perfect pasteurization, because it does not go part way through the sterilizing-compartment before reaching the maximum temperature of that compartment.

My invention consists in details of construction hereinafter particularly described, and pointed out in the claims.

Figure I is a view of my improved machine, part in vertical section and part in elevation. Fig. II is a detail view showing the upper portion of one leg of the attemperating-compartment. Fig. III is an enlarged section showing one of the regulators. Fig. IV is a top or plan view of the automatic pump. Fig. V is a vertical section illustrating the manner of mounting the rollers located at the bottom of the attemperating, sterilizing, and cooling compartments and under which the traveling carrier passes, the section being taken on line V V, Fig. VI. Fig. VI is a vertical section taken on line VI VI, Fig. V. Fig. VII is a section taken on line VII VII, Fig. IV. Fig. VIII is a section taken on line VIII VIII, Fig. VII.

1 2 represent a pair of legs forming a compartment through which the beer first passes. 3 4 represent a pair of legs forming a compartment through which the beer next passes, and 5 6 a pair of legs forming a compartment through which the beer finally passes. The first pair of legs form what may be termed an "attemperating-compartment," for in these legs the beer is gradually heated toward the maximum temperature to which it is exposed while passing through the legs 3 and 4, which form the sterilizing-compartment wherein the beer is pasteurized. From the sterilizing-compartment the beer passes through the legs 5 and 6, which form what I call a "cooling-compartment," inasmuch as the temperature of the beer is here reduced and finally escapes therefrom at approximately atmospheric temperature, or at least so low a temperature that the bottles are not likely to become broken by sudden exposure to the atmosphere as they leave the machine. The legs are all connected by upper and lower elbows, so that the legs and elbows form a single continuous conduit or chamber from the open upper end of leg 1 to the open upper end of leg 6, and the beer is not exposed to the atmosphere from the time it enters the machine until it leaves it. The legs are located between upper sills 7 and lower sills 8, that are connected together by posts 9, or any other suitable means may be provided for supporting the legs.

The bottles are passed through the machine in the direction of the arrow, Fig. I, the bottles being placed in suitable receptacles 10, pivotally connected to an endless carrier composed of chains that pass over sprocket-wheels 11, located at the four corners of the machine.

In the use of the machine the three compartments are filled with water or other fluid nearly to their tops, the water in the sterilizing-compartment being heated by means of steam introduced through a pipe 12 until the temperature is raised sufficiently high to effect the pasteurization of the beer. In starting the machine (and subsequently, if desired) the water in the attemperating and cooling compartments may likewise be brought to the proper temperature through means of fluid introduced through pipes corresponding to the pipe 12. The introduction of steam through the pipe 12 is automatically controlled by a regulator 13, (see Figs. I and III,) which is attached to the lower portion of the sterilizing-compartment and which may be of any well-known form or type. The regulator controls the passage of compressed air through a pipe 14, which air acts to close the valve 15 in pipe 12 when the temperature of the water in the sterilizing-compartment has been raised to the desired height. As stated, any form of temperature-regulator may be employed; but I prefer to use such a regulator as is illustrated in detail in Fig. III, as it is simple in construction and positive in operation. In this construction a cylindrical casing 16 is secured in any suitable manner to the wall of the sterilizing-compartment, and to said casing is formed integrally a tubular portion 17, that extends some little distance into the lower part of the sterilizing-compartment. Screw-seated in the outer end of this tubular portion 17 is the end of a rod 18, the opposite end of which carries a valve-plug 19, having a conical end 20. The outer end of the casing 16 is closed by a plug or cap 21, on the outer face of which is provided a dial 22. Passing through the center of this plug 21 in alinement with the center of the rod 18 is a screw-threaded rod 23, the outer end of which is provided with a nut 24 and an indicating-finger 25. Passing approximately half-way through the length of the rod 23 is a bore or passage-way 26, the inner end of which extends laterally in one direction through the rod 23 and communicates with a groove 27, formed in the screw-threaded portion of the rod. The inner end of the tubular portion of this rod 23 terminates in a valve-seat adapted to receive the conical end of the plug 19. Formed in the plug 21 is a passage-way 28, the inner end of which communicates with the groove 27. The upper part of the air-pipe 14 is tapped into the plug 21 and is in communication with the passage-way 28. On the opposite side of the plug 21 the lower part of the air-pipe 14 is tapped into said plug and is in communication with a bore or passage-way 29, the inner end of which communicates with a chamber within the casing 16. The regulator is set by adjusting the nut 24, which turns the rod 23 in the desired direction to bring the finger 25 to the proper point on the dial 22, and by this operation the position of the valve-seat at the inner end of the rod 23 relative to the conical end of the plug is varied, for the reason that the rod 23 is moved toward or drawn away from the valve-plug 19, according to the direction in which said rod is turned. The proper temperature within the sterilizing-compartment expands the tubular portion 17 sufficient to cause the valve-plug 19 to remain unseated, and while in this position the compressed air from the pipe 14 passes through the bore 29 into the chamber within the casing, from thence through the bores 26 and 28 into and through the upper part of pipe 14 to the diaphragm-valve 15 to keep said valve closed. When the temperature within the sterilizing-compartment falls below the proper point, or the point at which the valve is set to actuate, the contraction of the tubular portion 17 due to the lowering of the temperature will move the conical plug 19, carried by the rod 18, which is in turn carried by the tubular portion 17, toward and against the valve-seat on the rod 23, thus closing the passage of the compressed air through the regulator. The supply of compressed air thus being shut off will allow the diaphragm-valve to open, and steam is admitted to the sterilizing-compartment through the pipe 12. When the valve 19 closes, the air in the upper part of the pipe 14 escapes under the steam-pressure through a valve 14$^a$, (see Fig. I,) which is so adjusted as to always have a small leak.

31 represents a pipe forming a communication between the leg 5 of the cooling-compartment and the suction side of a rotary pump 30 of any well-known construction.

31$^a$ and 31$^f$ are pipes forming a communication between the discharge side of the pump 30 and the leg of the attemperating-compartment. The pipes 31, 31$^a$, and 31$^f$ and the pump 30 serve to conduct the water from the inner leg of the cooling-compartment to the inner leg of the attemperating-compartment, thus bringing water that has been heated in cooling the hot beer in the cooling-compartment into the attemperating-compartment, where the waste heat is utilized for the preliminary or initial heating of the beer.

Between the pipe 31$^a$ and pipe 31$^f$ is a valve 32, (see Figs. VII and VIII,) this valve controlling the passage of water from the pump to the leg 2. The valve 32 comprises a globular casing divided centrally by a partition 32$^a$ into two compartments 32$^c$ and 32$^d$, connected together by a passage-tube 32$^b$, into which leads the pipe 31$^a$, while the pipe 31$^f$ is connected to the compartment 32$^c$. The pipe 33, the object of which will be hereinafter set forth, connects to the compartment 32$^d$. Extending through the valve-casing is a valve-stem 35$^a$, operated by a means hereinafter described and carrying disks 32ᵉ, which upon the movement of the valve-stem simultaneously close one end of the tube 32ᵇ and open the other end. When the valve is in the position shown by dotted lines in Fig. VIII, the water circulates through the pipes 31 and 31ᵃ from the leg 5 to the leg 2; but when the valve is moved to the position shown in full lines, Fig. VIII, the water circulates around the pump through a by-pipe 33, which connects the outlet of the pipe to the inlet, so that at this time there is no movement of the water from leg 5 to leg 2, and the water is caused to take this course when the water in leg 2 is at the desired temperature through means of a regulator 34, attached to the leg 2 and connected to the diaphragm 35 of the valve 32 by means of a compressed-air pipe 36. The construction and operation of the regulator 34 is the same in all respects as the construction and operation of the regulator shown in Fig. III and which has been described. As soon as the temperature of the water in leg 2 falls beneath the desired point the regulator operates and the pump starts a circulation of water from leg 5 to leg 2, the regulator acting to move the valve from the position shown in full lines, Fig. VIII, to the position shown in dotted lines. As soon as the temperature in the leg 2 reaches the desired height the regulator 16 operates again and the water simply circulates around the pump through the pipe 33, the pump being thus kept in continuous operation. To complete the circulation between legs 2 and 5, a connection is made between legs 1 and 6 by the use of a pipe 37, (see Fig. I,) the cold water produced by the final heating of the beer thus passing around the legs 6 and 5 and acting to keep down the temperature in these legs which has been created by the hot beer as it passes through these legs from the sterilizing-compartment.

While I have described somewhat in detail the construction and operation of the regulators and the pump circulating system for the purpose of illustrating the operation of the machine that is shown in the drawings, yet I do not make any claims therefor in this application, as the same is the subject-matter of the invention claimed in my application referred to.

I will now proceed to describe the features that are specially claimed in this application and which may be used either with or without the regulator and circulating system that have been described.

As stated, the pasteurization of the beer takes place in the portions 3 4 of the conduit, the beer being gradually heated from the time it enters the machine and while it is passing through the compartment 1 2 of the machine. Necessarily the temperature in the main portion of the compartment 1 2 must be lower than the sterilizing temperature in the compartment 3 4, for if the cooled bottles were at first subjected to the temperature of the sterilizing heat they would be broken. The beer is therefore gradually heated as it advances toward the sterilizing-compartment; but so far as I know no pasteurizer has ever been made wherein the beer has been heated to approximately the maximum temperature of the sterilizing-compartment before entering said compartment, and therefore it passes part way through the sterilizing-compartment before it has been raised to the desired temperature for pasteurization. Beer has to be subjected to the pasteurizing heat a sufficient length of time to thoroughly effect pasteurization and when, as heretofore, it has been moved part way through the pasteurizing-compartment before reaching the maximum temperature it has to move corresponding slower in order to be subjected to the maximum pasteurizing heat a sufficient length of time before leaving the sterilizing-compartment. It is the principal object of my present invention to provide a means whereby the beer will be heated to approximately the maximum temperature of the sterilizing-compartment before entering said compartment, so that upon entering the compartment it is heated approximately to the maximum degree, and therefore is subjected to the maximum temperature all the time that it is passing through the sterilizing-compartment, the result being that the machine can be operated considerably faster and its capacity correspondingly increased. To accomplish this end, I provide the upper portion of the attemperating-compartment of the conduit with a chamber or enlargement 40, which is in communication with the upper portion of leg 2 of the attemperating-compartment, and means for heating the fluid in this chamber is provided and which may consist of a steam-pipe 41. The fluid is heated in this chamber to as an approximately high a temperature as that of the sterilizing-compartment of the conduit, so that as the bottles are passing through the last part of the attemperating-compartment they pass through approximately as high a temperature as that of the sterilizing-compartment, and they thus enter the sterilizing-compartment at as an approximately high a temperature as that contained in the sterilizing-compartment, and thus they are subjected to the sterilizing temperature all the time that they are passing through the sterilizing-compartment of the conduit. It will be observed that legs 2 and 3 of the conduit are connected by a closed elbow, so that the bottles do not pass into the open air as they are conducted from leg 2 to leg 3, but remain in approximately the same temperature as that to which they have been subjected before passing from one leg to the other. The legs 4 and 5 are likewise connected by an elbow, so that the beer at this point is not exposed to the atmosphere while moving from one leg to the other, and thus at no place in the machine is the beer subjected to atmospheric temperature from the time it enters the machine until the time it leaves.

The steam-pipe 41 is provided with a diaphragm-valve 42, connected to the chamber 40 by means of a pipe 43, provided with a regulator 44, that corresponds in construction and operation to the regulator 13, so that the steam is automatically turned on and off in the pipe 41 as the temperature in the chamber 40 rises above or falls below the temperature which the regulator has been set to maintain.

In order to maintain a substantially uniform temperature between the two parts of the sterilizing-compartment, I provide a pipe 51, forming a communication between the legs 3 and 4 and being connected to a rotary pump 52, like the pump 30, of any well-known construction to cause a circulation of water between the two points in the sterilizing-compartment.

The delivery end of the pipe 31ª is provided with two branches, 31ᵇ and 31ᶜ, one of which connects with the upper end of leg 2, while the other connects with the chamber 40 directly. At the junction of these branches is a valve 40ª, so that more or less of the water may be caused to pass through either branch, or all of the water may be caused to pass through one of the branches. By regulating the amount of water that passes through the branch that connects with the chamber 40 the area of the hot water in the upper part of the leg 2 will be increased or diminished, because the greater the flow of water through this branch (the heat in the pipe 41 being kept up accordingly) the greater will be the flow of hot water from the chamber 40 down through the leg 2, so that the beer will be subjected for a greater or less time, as desired, to this heat in leg 2, that corresponds approximately to the heat of the sterilizing-compartment.

In my application referred to the endless carrier passes beneath rollers or pulleys located in the lower elbows of the conduit. These pulleys occupy considerable room and necessitate the use of a long elbow, and they necessarily cause the bottle-carrying receptacles to traverse the elbows a considerable distance beneath the upper bends of the elbows, the result of which is that the bottles go through a different temperature of water as they round the elbows from what they were in before starting to pass through the elbows and a different temperature from what they are in when they emerge from the elbows. This is due to the fact that with a long elbow, which is necessitated by the use of wheels, the water in the upper part of the elbow is much warmer than the water in the lower part and is of approximately the same temperature as the water in the two legs of the compartment above the bend of the elbow, this difference in temperature being due to the fact that there is a large amount of practically dead cool water in the lower part of the elbow, for the warm water that circulates from one leg to another of the compartment of course passes through the upper part of the elbow, it being lighter, and leaves the water in the lower part of the elbow practically undisturbed, which becomes chilled, the result being, as stated, that the beer is passed through colder water as it rounds the elbow than it left before reaching the elbow and that it enters after it leaves the elbow. This is objectionable, as it is not desirable to have the beer chilled or cooled down in temperature while passing from one leg to another of a compartment. To obviate these difficulties, I journal friction-rollers 45 in these lower elbows to receive the carrier. By using the rollers instead of wheels a shallow elbow can be employed, and the temperature of the water in the lower part of the elbow is practically the same as the temperature of the water in the legs on each side of the elbow and there is practically a circulation of all of the water in the elbow, as the volume there is practically the same as it is in the vertical parts of the legs. As shown in Figs. V and VI, these rollers are mounted on studs 46, secured to the outer wall of the conduit by means of shanks 47, provided with nuts 48, gaskets 49 being employed to make a tight joint. The rollers are preferably provided with dovetailed hardwood fillers 50, that form a journal-bearing between the rollers and the studs. By using these friction-rollers the carrier can pass close up to the inner bends of the elbows, as shown in Fig. I.

I do not herein claim a pasteurizer comprising a pair of water-legs forming an attemperating-compartment, a pair of water-legs forming a sterilizing-compartment, a pair of water-legs forming a cooling-compartment, means for conveying the substance to be sterilized through said legs, and means for creating a circulation of water between the attemperating-compartment and cooling-compartment, as such forms the subject-matter of my application filed September 16, 1901, Serial No. 75,509, Patent No. 701,622.

By forming the legs that constitute the attemperating, sterilizing, and cooling compartments in their separated form and connecting them at the top and bottom by elbows atmospheric air is allowed to circulate between the different legs, so that the temperature of one leg will not radiate to another and effect the temperature of the water in such other leg.

I claim as my invention—

1. A pasteurizer having an attemperating-compartment, a sterilizing-compartment, and a cooling-compartment said attemperating-compartment being provided with means for heating the substance under treatment to approximately as high a temperature as that of the sterilizing-compartment just before the substance leaves the attemperating-compartment, substantially as described.

2. A pasteurizer having an attemperating-compartment, a sterilizing-compartment, and a cooling-compartment, all formed in a continuous conduit, said attemperating-compartment being provided with means for heating the substance under treatment to approximately as high a temperature as that of the sterilizing-compartment just before the substance leaves the attemperating-compartment, substantially as set forth.

3. A pasteurizer consisting of an attemperating-compartment, a sterilizing-compartment, and a cooling-compartment, said attemperating-compartment being provided with an enlargement or chamber at its junction with the sterilizing-compartment, and said chamber being provided with means for heating the fluid to approximately as high a temperature as that of the sterilizing-compartment, whereby the substance being treated is heated to as an approximately high a temperature as that of the sterilizing-compartment just before entering the last-mentioned compartment, substantially as set forth.

4. A pasteurizer comprising an attemperating-compartment, a sterilizing-compartment, and a cooling-compartment, said attemperating-compartment being provided with an enlargment or chamber near its junction with the sterilizing-compartment, means for heating the water in said enlargement or chamber, and means for causing a circulation of water between the cooling-compartment and said chamber of the attemperating-compartment, substantially as set forth.

WILLIAM J. RUFF.

In presence of—
GERHARD G. ARENDS,
FRANK A. LUBBE.